(12) United States Patent
Line et al.

(10) Patent No.: US 11,124,147 B2
(45) Date of Patent: Sep. 21, 2021

(54) SEAT ASSEMBLY WITH DEPLOYABLE BELT MEMBER

(71) Applicant: Ford Global Technologies, LLC, Dearborn, MI (US)

(72) Inventors: Johnathan Andrew Line, Northville, MI (US); Sean Bayle West, Monroe, MI (US); Edward Joseph DeSmet, Canton, MI (US); Benjamin Yilma, Canton, MI (US); Srinivasan Sundararajan, Ann Arbor, MI (US); Alan George Dry, Grosse Pointe Woods, MI (US); Marcos Silva Kondrad, Macomb Township, MI (US); Spencer Robert Hoernke, Dundas (CA); S. M. Akbar Berry, Windsor (CA); Derek Board, Ferndale, MI (US); Raed Essa EL-Jawahri, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 113 days.

(21) Appl. No.: 16/573,091

(22) Filed: Sep. 17, 2019

(65) Prior Publication Data
US 2021/0078521 A1    Mar. 18, 2021

(51) Int. Cl.
*B60R 21/2334*    (2011.01)
*B60R 21/207*    (2006.01)
*B60N 2/80*    (2018.01)

(52) U.S. Cl.
CPC ........ *B60R 21/2334* (2013.01); *B60R 21/207* (2013.01); *B60N 2/80* (2018.02)

(58) Field of Classification Search
CPC ................................ B60R 21/234; B60N 2/80
See application file for complete search history.

(56) References Cited

U.S. PATENT DOCUMENTS

| | | |
|---|---|---|
| 5,456,491 A | 10/1995 | Chen et al. |
| 5,704,638 A | 1/1998 | Lane, Jr. |
| 6,079,745 A | 6/2000 | Wier |
| 7,607,687 B2 | 10/2009 | Clute et al. |
| 7,976,066 B2 | 7/2011 | Bok et al. |
| 8,672,347 B2 | 3/2014 | Schneider et al. |
| 9,114,780 B2 | 8/2015 | Fischer et al. |
| 9,199,560 B2 | 12/2015 | Line et al. |
| 10,336,284 B2 * | 7/2019 | Dry ..................... B60R 21/2334 |

(Continued)

*Primary Examiner* — Faye M Fleming
(74) *Attorney, Agent, or Firm* — David Coppiellie; Price Heneveld LLP (57) ABSTRACT

A seat assembly includes a seatback having a back support portion centrally disposed thereon. A retractor mechanism is operably coupled to the seatback. A belt member is coupled to the retractor mechanism. The belt member further includes a body portion disposed between first and second ends of the belt member. The body portion of the belt member is operable between a stowed position and a deployed position. The belt member is disposed in front of the back support portion of the seatback in the deployed position. The belt member is disposed in an interior portion of the seatback in the stowed position. The seat assembly further includes an airbag assembly to which the belt member is attached. The belt member is deployed when the airbag assembly is deployed as coupled thereto.

17 Claims, 9 Drawing Sheets

(56) References Cited

U.S. PATENT DOCUMENTS

| | | |
|---|---|---|
| 10,518,733 B2 * | 12/2019 | Dry ...................... B60R 21/207 |
| 10,632,955 B2 * | 4/2020 | Markusic ................. B60N 2/99 |
| 10,940,824 B2 * | 3/2021 | Nagasawa ............. B60R 21/207 |
| 2018/0022244 A1 | 1/2018 | Duncan et al. |
| 2020/0307491 A1 * | 10/2020 | Nagasawa ............. B60R 21/207 |
| 2020/0391690 A1 * | 12/2020 | Faruque .............. B60R 21/2338 |
| 2021/0009067 A1 * | 1/2021 | Kadam ............... B60R 21/2338 |
| 2021/0039578 A1 * | 2/2021 | Rupp .................... B60R 21/207 |
| 2021/0039579 A1 * | 2/2021 | Shimizu ............... B60R 21/268 |

\* cited by examiner

SEAT ASSEMBLY WITH DEPLOYABLE BELT MEMBER

FIELD OF THE INVENTION

The present invention generally relates to a seat assembly, and more particularly, to a seat assembly having a belt member that is deployed with an airbag assembly for seat occupant position management.

BACKGROUND OF THE INVENTION

Seat occupant position management features are desired for a seat assembly within a modular seatback construction. A deployable belt member can be used for seat occupant restraint.

SUMMARY OF THE INVENTION

According to one aspect of the present invention, a seat assembly includes a seatback having a back support portion centrally disposed thereon. At least one retractor mechanism is operably coupled to the seatback and includes first and second attachment locations spaced-apart from one another. A belt member includes first and second ends respectively coupled to the first and second attachment locations of the at least one retractor mechanism. The belt member further includes a body portion disposed between the first and second ends that is operable between a stowed position and a deployed position. The belt member is disposed in front of the back support portion of the seatback in the deployed position. The belt member is disposed in an interior portion of the seatback in the stowed position.

According to another aspect of the present invention, a seat assembly includes a seatback including an interior portion. A belt member includes first and second ends with a body portion disposed therebetween. The belt member is operable between a stowed position, wherein the body portion of the belt member is received within the interior portion of the seatback, and a deployed position, wherein the body portion of the belt member is positioned outside of the interior portion of the seatback.

According to yet another aspect of the present invention, a seat assembly includes a belt member spanning between opposed sides of a seatback and operable between stowed and deployed positions. A retractor mechanism is operably coupled to the belt member and operative to retract the belt member from the deployed position. An inflatable member is disposed on the belt member and operable between inflated and deflated conditions.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figures 1, 2:
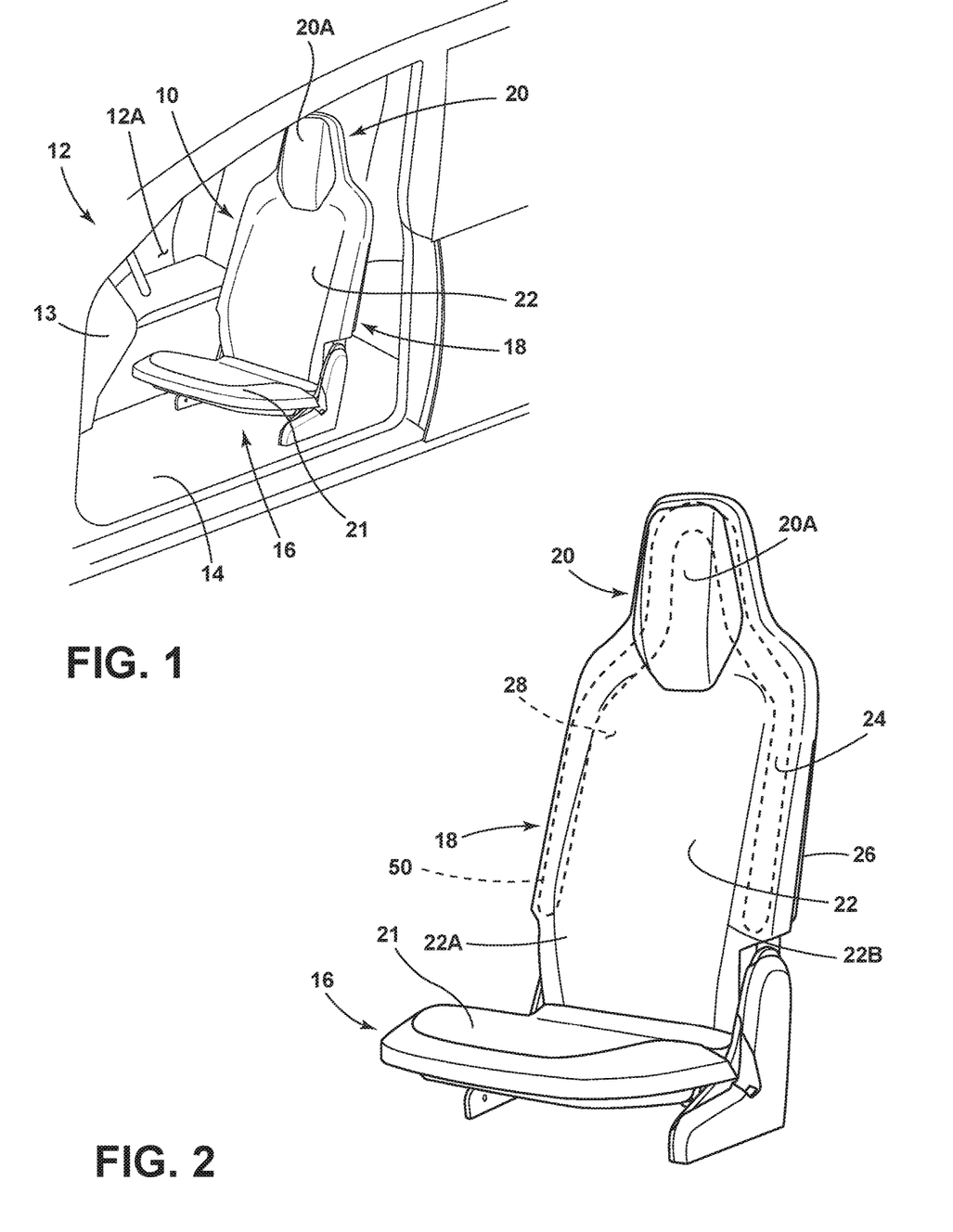
FIG. 1 is a front perspective view of a seat assembly positioned within a vehicle interior.
FIG. 2 is a front perspective view of the seat assembly of FIG. 1 as removed from the vehicle and showing an overhead airbag assembly in phantom.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, a seat assembly 10 is shown disposed within an interior 12A of a vehicle 12. Specifically, the seat assembly 10 is disposed within the vehicle interior 12A adjacent to an instrument panel or dashboard 13. In FIG. 1, the seat assembly 10 is positioned in a driver's side seating area. However, it is contemplated that the seat assembly 10, or various components and features thereof, can be disposed on other seat assemblies positioned in other areas of a vehicle interior 12A, such as the passenger side seating area, a rear seating area, or a third row seating option for example. The seat assembly 10 is shown in FIG. 1 as being supported on a vehicle floor support surface 14 and generally includes a substantially horizontal seat portion 16 and a substantially upright seatback 18. It is contemplated that the seat assembly 10 may be configured to rotate within the vehicle interior 12A between forward-facing and rearward-facing configurations. As such, it is contemplated that the vehicle 12 may be an autonomous or self-driving vehicle, in which a seat assembly having forward-facing and rearward-facing capabilities could be used.

As shown in FIGS. 1 and 2, a headrest assembly 20 is disposed on an upper portion of the seatback 18 and includes a forwardly extending headrest bun 20A. The headrest assembly 20 and the seatback 18 may be integrated components or modular components coupled to one another. As further shown in FIG. 1, the seat portion 16 includes an upper support surface 21 configured to support a seat occupant thereon. Further, the seatback 18 includes a back support portion 22 that is centrally disposed on the seatback 18.

With specific reference to FIG. 2, the back support portion 22 is contemplated to include various support materials, such as cloth and foam materials, packaged on an exterior comfort carrier module, or font carrier module 24, to support the back of a seat occupant seated on the seat assembly 10. The back support portion 22 of the seatback 18 includes opposed sides 22A, 22B that are spaced-apart from one another. As further shown in FIG. 2, the headrest assembly 20 is disposed above the back support portion 22 of the seatback 18 and may be an integrated feature of the front carrier module 24. In assembly, the front carrier module 24 is coupled to a rear carrier module 26 around a seatback frame 30 (FIG. 3) in a partially detachable manner, as further described below. The coupling of the front carrier module 24 and the rear carrier module 26 defines an interior portion 28 of the seatback 18 disposed between the front carrier module 24 and the rear carrier module 26. The seatback frame 30 (FIG. 3) is disposed within the interior portion 28 of the seatback 18 in assembly.

As further shown in FIG. 2, the seat assembly 10 includes an airbag assembly 50 disposed within the interior portion 28 of the seatback 18. The airbag assembly 50 is operable between deployed and stowed positions. In FIG. 2, the airbag assembly 50 is shown in the stowed position, in which the airbag assembly 50 is supported and contained within the interior portion 28 of the seatback 18. The airbag assembly 50 is configured to deploy from the stowed position to a deployed position in a seat-forward direction around the back support portion 22 of the seatback 18, as shown in FIGS. 6 and 8-10. The airbag assembly 50 is disposed along the opposed sides 22A, 22B of the back support portion 22 of the seatback 18 and is further disposed around an outer perimeter of the headrest assembly 20 of the seatback 18 in the stowed position. In this way, the airbag assembly 50 is an overhead airbag assembly that is configured to outwardly deploy to surround a seat occupant, much like the airbag assemblies disclosed in U.S. patent application Ser. Nos. 16/370,617 and 16/370,519 entitled SEAT ASSEMBLY WITH FULL SEATBACK AIRBAG filed Mar. 29, 2019, which are hereby incorporated by reference in their entireties.

Figure 3:
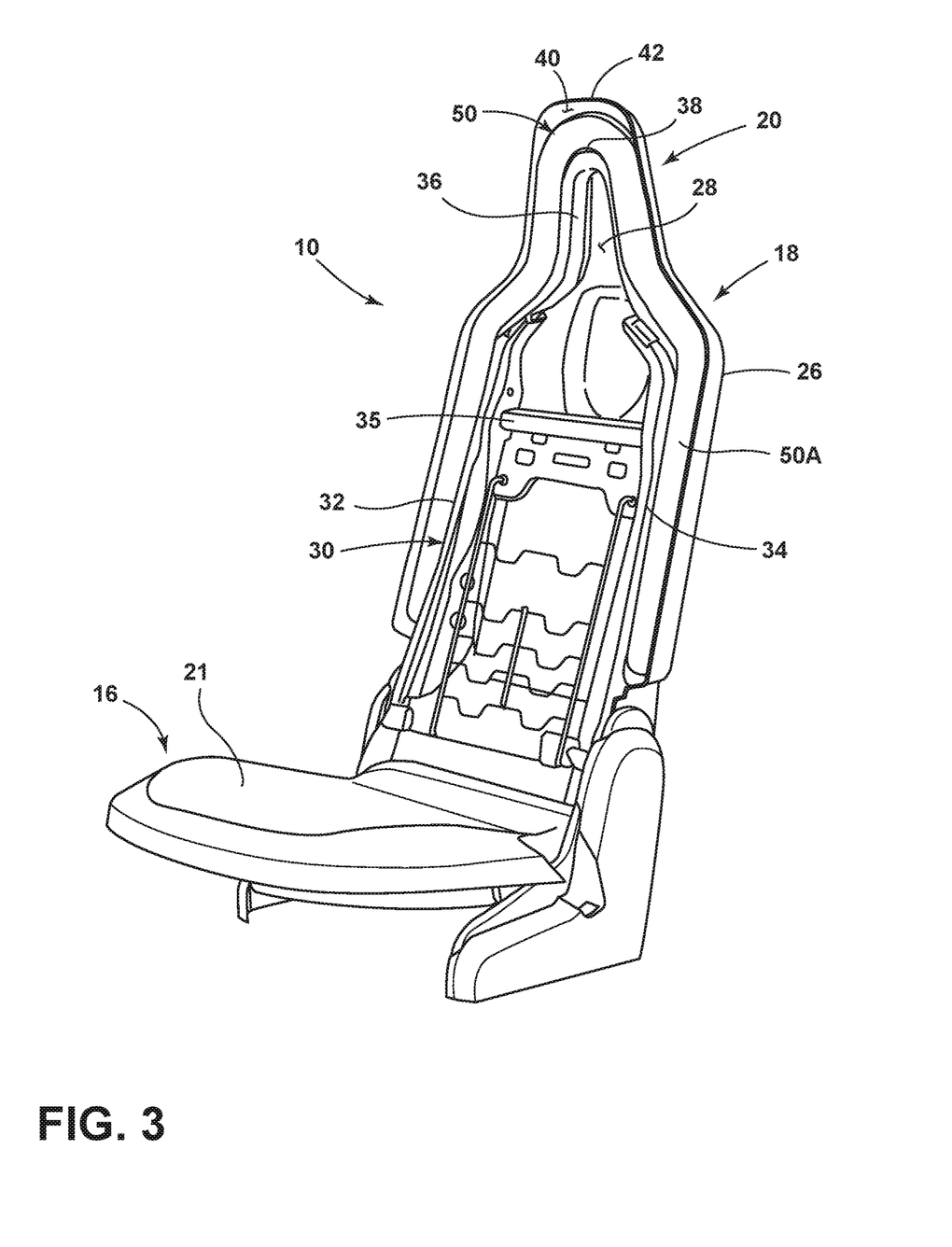
FIG. 3 is a front perspective view of the seat assembly of FIG. 2 with a front carrier module removed to reveal a seatback frame and the overhead airbag assembly.

Referring now to FIG. 3, the seat assembly 10 is shown with the front carrier module 24 removed therefrom to reveal a seatback frame 30 disposed within the interior portion 28 of the seatback 18. The seatback frame 30 is shown having a generally inverted U-shaped configuration partially defined by first and second side members 32, 34 which are generally disposed in an upright orientation and spaced-apart from one another. The first and second side members 32, 34 are interconnected by an upper cross-member 35 and are contemplated to be mirror images of one another, such that the description of one side member also describes the other side member in a mirrored configuration. As further shown in FIG. 3, an upper frame member 36 interconnects the first and second side members 32, 34 of the seatback frame 30. Thus, the first and second side members 32, 34 and the upper frame member 36 cooperate to generally define the overall inverted U-shaped configuration of the seatback frame 30.

With further reference to FIG. 3, the airbag assembly 50 is shown disposed within a raceway 40 defined between an outer perimeter edge 38 of the seatback frame 30 and a front edge 42 of the rear carrier module 26. The airbag assembly 50 includes an elongate body portion 50A, such that the airbag assembly 50 is an elongate member having an overall inverted U-shaped configuration in the stowed position shown in FIG. 3. In this way, the body portion 50A of the airbag assembly 50 extends all the way around the outer perimeter edge 38 of the seatback frame 30 as received in the raceway 40 within the interior portion 28 of the seatback 18 when the airbag assembly 50 is in the stowed position. It is contemplated that the airbag assembly 50 is a flexible member, such that the body portion 50A of the airbag assembly 50 can fit within the contours of the raceway 40. Thus, the airbag assembly 50 of the present concept is provided to surround the entire seatback 18 at an outer portion thereof, such that the airbag assembly 50 of the present concept is an overhead airbag assembly that surrounds the arms, torso and head of a seat occupant as seated within the seat assembly 10 when the airbag assembly 50 is deployed. This surround feature of the airbag assembly 50 in a deployed position relative to a seated seat occupant is illustrated in FIGS. 6 and 8-10 and further described below.

Figure 4A:
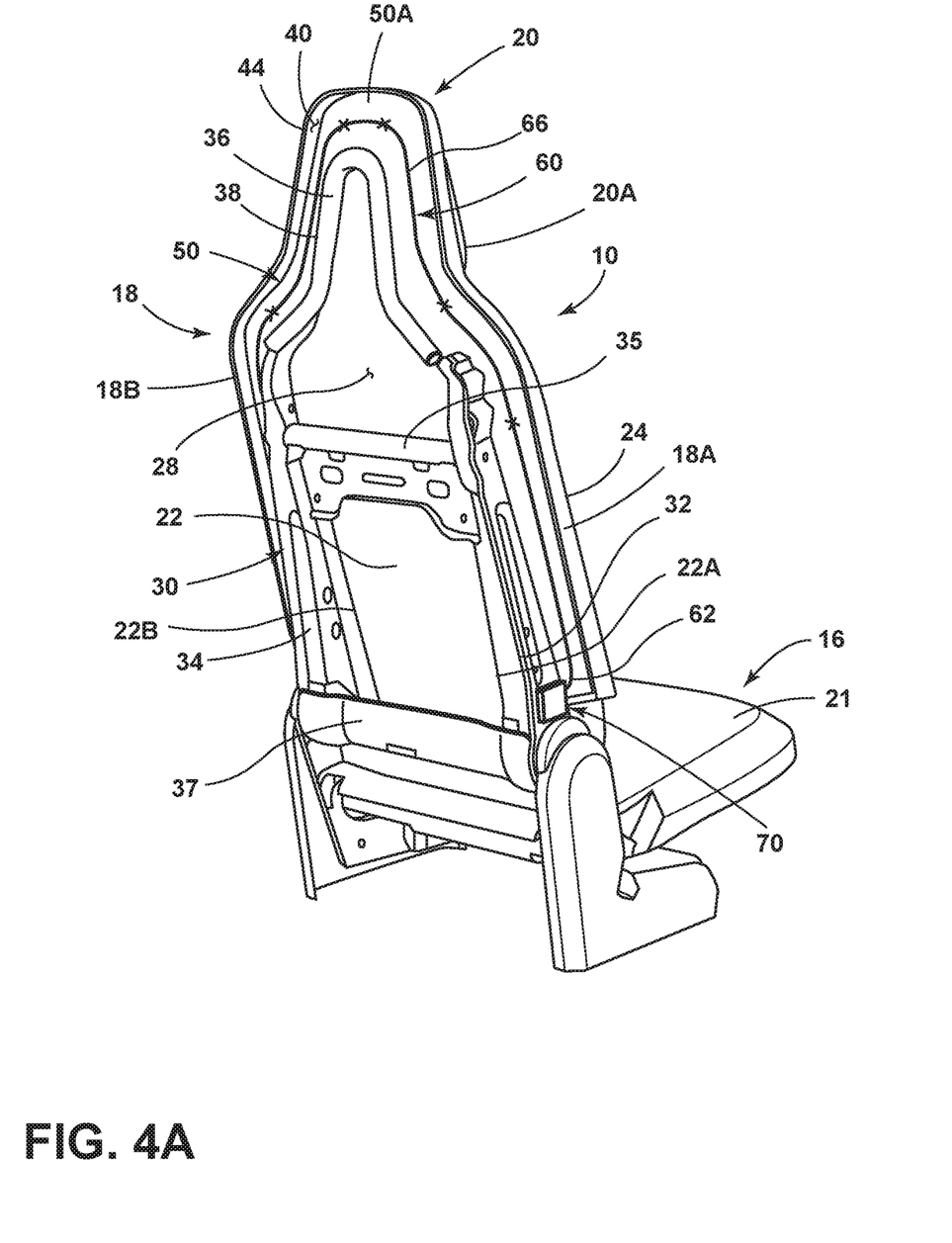
FIG. 4A is a rear perspective view of the seat assembly of FIG. 2 with a rear carrier module removed to reveal the seatback frame, the overhead airbag assembly and a belt member coupled to the overhead airbag assembly and an end of the belt member coupled to a retractor mechanism.

Referring now to FIG. 4A, the seat assembly 10 is shown with the rear carrier module 26 removed from the seatback 18 to reveal the seatback frame 30 as positioned relative to the front carrier module 24 within the interior portion 28 of the seatback 18. As shown in FIG. 4A, the outer perimeter edge 38 of the seatback frame 30 is disposed at an inset position relative to a rear edge 44 of the front carrier module 24. Specifically, the rear edge 44 of the front carrier module 24 is spaced-apart outwardly from the outer perimeter edge 38 of the seatback frame 30 to further define the raceway 40 therebetween. Thus, the raceway 40, in which the airbag assembly 50 is supported in the stowed position, is defined between the front carrier module 24, the rear carrier module 26 and the seatback frame 30. As further shown in FIG. 4A, a lower cross member 37 of the seatback frame 30 interconnects the first and second side members 32, 34 of the seatback frame 30.

As further shown in FIG. 4A, a belt member 60 is shown as being disposed along the body portion 50A of the airbag assembly 50. The belt member 60 is contemplated to be operably coupled to the airbag assembly 50 at the "X" symbols shown in FIG. 4A for deployment with the airbag assembly 50. The "X" symbols show in FIG. 4A may include clips, stitches or other like coupling mechanisms that operably couple a body portion 66 of the belt member 60 to the airbag assembly 50 for deployment therewith. Thus, the belt member 60 is operable between stowed and deployed positions, and is shown in FIG. 4A in the stowed position, wherein the belt member 60 is received within the interior portion 28 of the seatback 18 along the raceway 40. The belt member 60 includes first and second ends 62, 64 (best shown in the embodiment of FIG. 4B) with the body portion 66 disposed therebetween and defining a length of the belt member 60 spanning between the first and second ends 62, 64. In FIG. 4A, the first end 62 of the belt member 60 is shown coupled to a retractor mechanism 70. The retractor mechanism 70 is provided to retract the belt member 60 after the belt member 60 is deployed, as further described below. The retractor mechanism 70 may be coupled to the seatback 18 at the seatback frame 30, and is shown in FIG. 4A as coupled to the first side member 32 of the seatback frame 30. In general, the retractor mechanism 70 is contemplated to be positioned within the interior portion 28 of the seatback 18 and therefore concealed by the front and rear carrier modules 24, 26 in assembly.

Figure 4B:
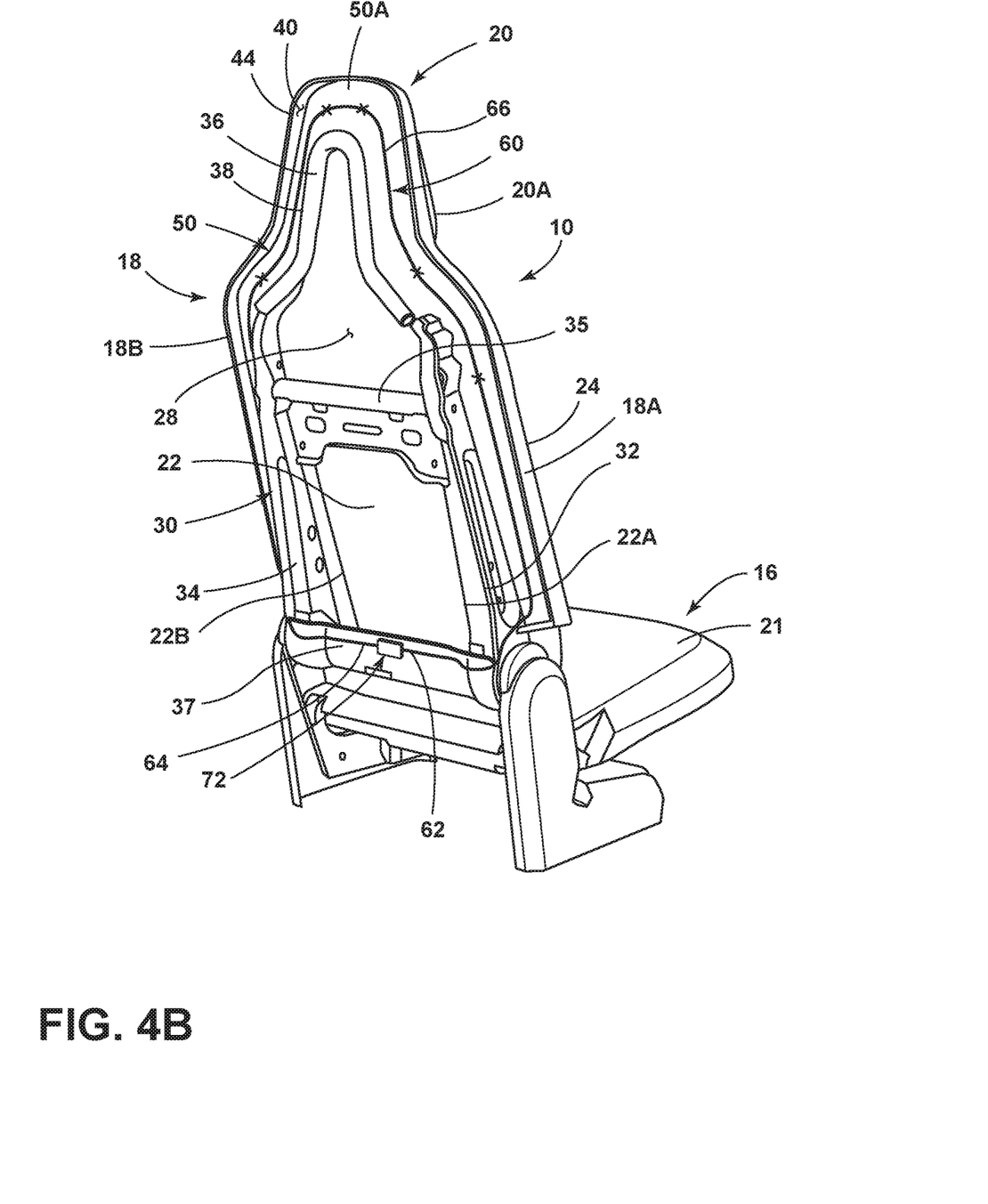
FIG. 4B is a rear perspective view of the seat assembly of FIG. 4A with opposed ends of the belt member coupled to a centrally disposed retractor mechanism.

Referring now to FIG. 4B, the belt member 60 is shown having the first and second ends 62, 64 thereof coupled to a retractor mechanism 72 which is further coupled to the lower cross member 37 of the seatback frame 30. Thus, the retractor mechanism 72 of the embodiment shown in FIG. 4B is contemplated to be a generally centrally disposed retractor mechanism positioned within the interior portion 28 of the seatback 18. With the first and second ends 62, 64 of the belt member 60 coupled to the retractor mechanism 72, it is contemplated that the retractor mechanism 72 can simultaneously retract the belt member 60 from opposed sides 18A, 18B of the seatback 18. The belt member 60 is disposed along the opposed sides 22A, 22B (FIG. 2) of the back support portion 22 of the seatback 18, and is further disposed around an outer perimeter of the headrest assembly 20 of the seatback 18 when the belt member 60 is in the stowed position. In this way, the belt member 60, much like the airbag assembly 50, is an overhead belt assembly that is configured to outwardly deploy to surround a seat occupant in the deployed position. In the embodiment of FIG. 4B, the first and second ends 62, 64 of the belt member 60 are coupled to attachment locations of the retractor mechanism 72 that are spaced-apart from one another on opposed sides of the retractor mechanism 72.

Figure 4C:
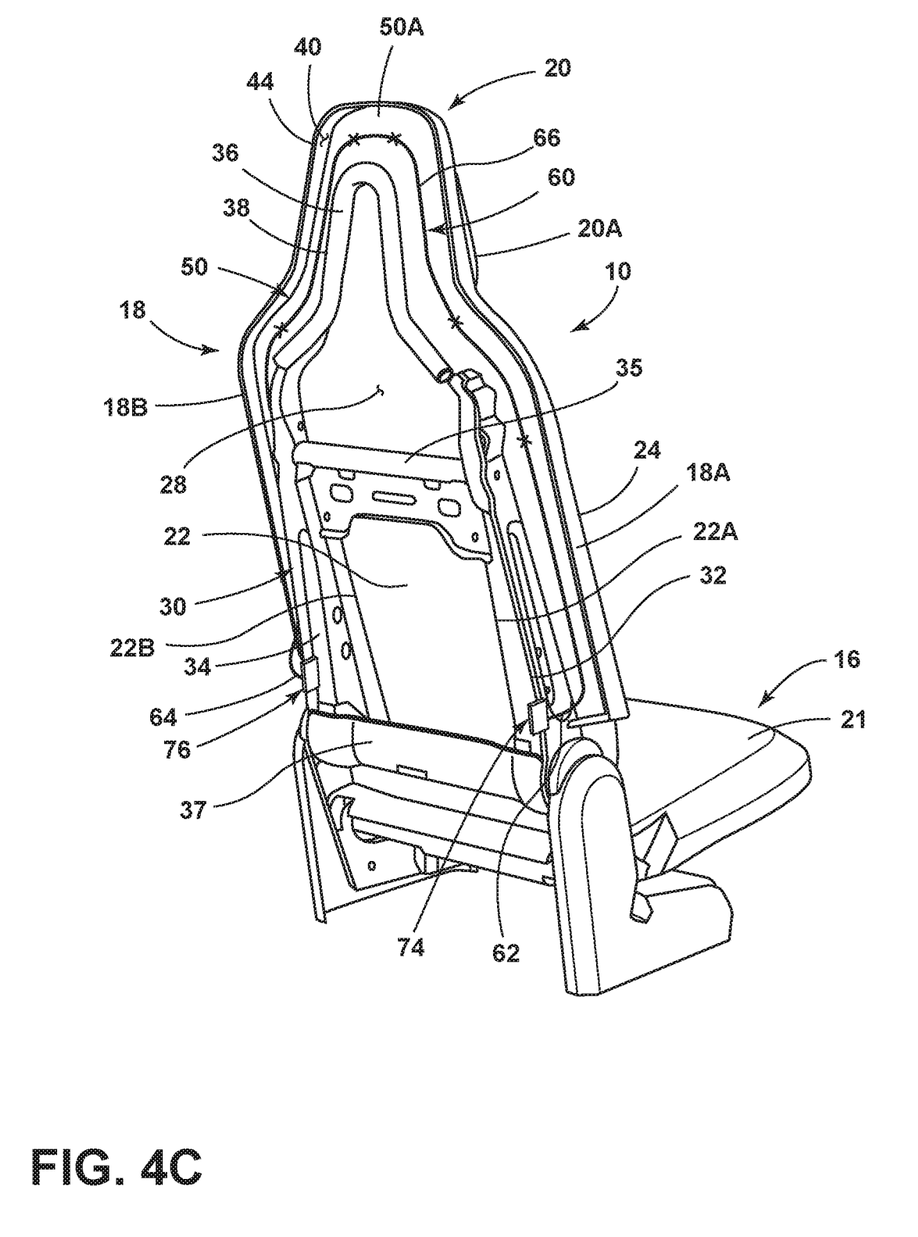
FIG. 4C is a rear perspective view of the seat assembly of FIG. 4B with the opposed ends of the belt member coupled to respective first and second retractor mechanisms.

Referring now to FIG. 4C, the belt member 60 is shown having the first and second ends 62, 64 thereof coupled to respective first and second retractor mechanisms 74, 76 which are further coupled to the first and second side members 32, 34 of the seatback frame 30. Thus, the first and second retractor mechanisms 74, 76 are positioned within the interior portion 28 and contemplated to be concealed by the interconnection of the front carrier module 24 and the rear carrier module 26 of the seatback 18. As coupled to the first and second side members 32, 34 of the seatback frame 30, the first and second retractor mechanisms 74, 76 are spaced-apart from one another and are operative to simultaneously retract the belt member 60 from the opposed sides 18A, 18B of the seatback 18. Put differently, the first and second ends 62, 64 of the belt member 60 will be retracted at attachment locations disposed on opposed sides 18A, 18B of the seatback 18 for a dual retraction of the body portion 66 of the belt member 60. First and second retractor mechanisms 74, 76 are further described below with reference to FIGS. 7C and 7D.

Figure 5:
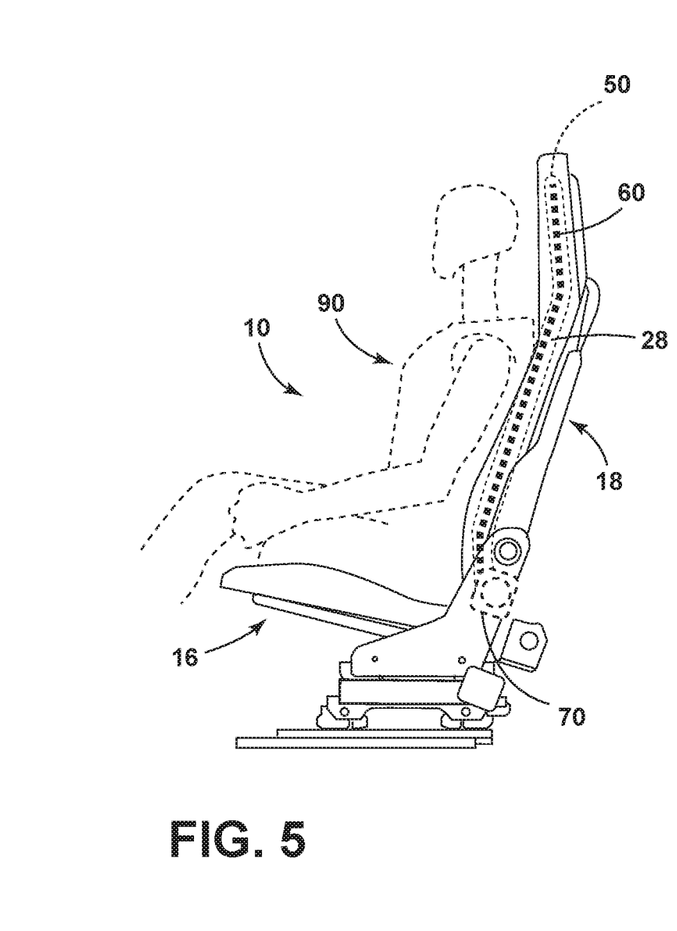
FIG. 5 is a side elevation view of the seat assembly of FIG. 2 with a seat occupant seated in the seat assembly and further showing the overhead airbag assembly and the belt member in stowed positions in phantom in the seatback.

Referring now to FIG. 5, a seat occupant 90 is shown seated on the seat assembly 10 in a generally upright position as supported on the seat portion 16. The seat occupant 90 is further supported by the seatback 18 in which the airbag assembly 50 and the belt member 60 are disposed in the interior portion 28 of the seatback 18 as operably coupled to one another in the stowed position. The retractor mechanism 70 is shown in phantom in FIG. 5 and is contemplated to be operably coupled to the seatback frame 30 in a similar manner as shown in FIG. 4A. In the embodiment shown in FIG. 5, it is contemplated that the retractor mechanism 70 would be coupled to the second side member 34 of the seatback frame 30, such that the retractor mechanism 70 is disposed on an opposite side of the seatback 18, as opposed to the embodiment shown in FIG. 4A.

Figure 6:
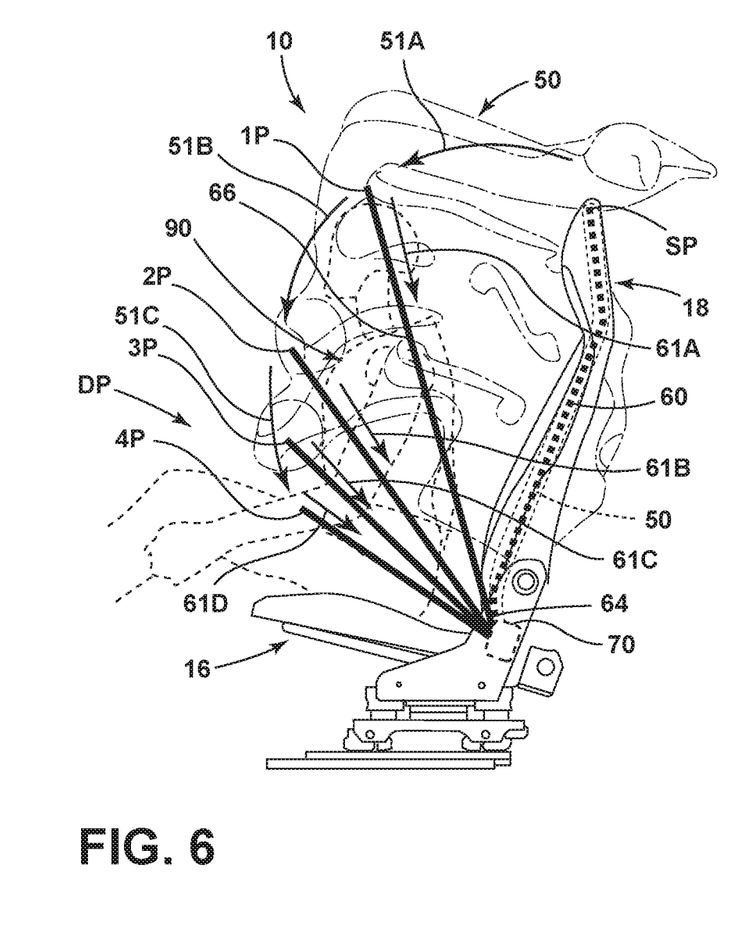
FIG. 6 is a side elevation view of the seat assembly of FIG. 5 showing relative movement of the overhead airbag assembly and the belt member deploying from the stowed positions, and further showing relative movement of the belt member during retraction of the belt member.

Referring now to FIG. 6, the airbag assembly 50 is shown as being deployed over the seat occupant 90 to surround the seat occupant 90. Specifically, in FIG. 6, the airbag assembly 50 and the belt member 60 are shown in phantom in a stowed position SP. From the stowed position SP, the airbag assembly 50 moves towards a deployed position DP around the seat occupant 90. As coupled to the airbag assembly 50, the belt member 60 moves towards a deployed position DP from the stowed position SP. Thus, the airbag assembly 50 and the belt member 60 exit the interior portion 28 of the seatback 18 and project in a seat-forward direction from the stowed position SP to the deployed position DP, such that the airbag assembly 50 and the belt member 60 are disposed around the centrally disposed back support portion 22 of the seatback 18 in the deployed position DP. As specifically shown in FIG. 6, the body portion 66 of the belt member 60 is shown being deployed around the seat occupant 90 at deployment positions 1P-4P. Deployment positions 1P-4P also correlate to attachment locations (as denoted by the symbol "X" in FIGS. 4B and 4C) of the body portion 66 of the belt member 60 to the airbag assembly 50. Thus, the belt member 60 and the airbag assembly 50 move over the head of the seat occupant 90 at the first deployment position 1P from the stowed position SP along the path as indicated by arrow 51A. From the first deployment position 1P to a second deployment position 2P, the airbag assembly 50 and the belt member 60 move downward along the path as indicated by arrow 51B. From the second deployment position 2P to a third deployment position 3P, the airbag assembly 50 and the belt member 60 move further downward along the path as indicated by arrow 51C around the seat occupant 90. From the third deployment position 3P, the airbag assembly 50 and the belt member 60 move further downward along the path as indicated by arrow 51D to a fourth deployment position 4P which correlates to a fully deployed position indicated at deployed position DP. In the deployed position DP, the belt member 60 is contemplated to be positioned around a hip location of the seat occupant 90 that may correlate to a location of a standard lap belt and a buckle position. In this way, the belt member 60 is contemplated to retain the seat occupant 90 in an upright seated position during an impact event which may have triggered deployment of the airbag assembly 50.

As further shown in FIG. 6, the body portion 66 of the belt member 60 is retracted by the retractor mechanism 70 along the path as indicated by arrows 61A-61D. As shown in FIG. 6, arrows 61A-61D illustrate a retractional movement of the belt member 60 from the respective deployment positions 1P-4P towards the retractor mechanism 70. Thus, it is contemplated that the retraction of the belt member 60 by the retractor mechanism 70 may occur immediately after deployment of the belt member 60 and the airbag assembly 50. It is further contemplated that the retraction of the belt member 60 by the retractor mechanism 70 may occur once the belt member 60 is at the deployed position DP.

Figure 7A:
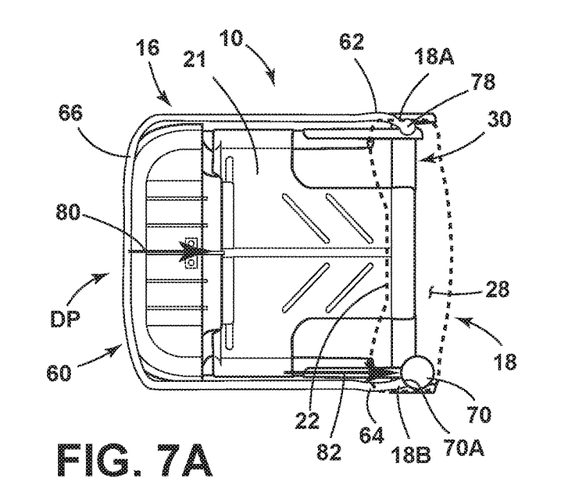
FIG. 7A is a top plan view of a seat portion of the seat assembly with the belt member in a deployed position and coupled to a retractor mechanism and the seatback shown in phantom.

Referring now to FIG. 7A, the seat assembly 10 is shown with the retractor mechanism 70 disposed within the interior portion 28 of the seatback 18. In the embodiment shown in FIG. 7A, the belt member 60 is shown in the deployed position DP around the upper support surface 21 of the seat portion 16. The first end 62 of the belt member 60 is shown coupled to the seatback frame 30 at anchor location 78. Thus, it is contemplated that the first end 62 of the belt member 60 in the embodiment shown in FIG. 7A is fixedly coupled to the anchor location 78 of the seatback frame 30. Thus, the retraction of the belt member 60 in the embodiment of FIG. 7A occurs only at the second end 64 of the belt member 60. As shown in FIG. 7A, the second end 64 of the belt member 60 is operably coupled to the retractor mechanism 70 at attachment location 70A. Retraction of the belt member 60 by the retractor mechanism 70 drives the belt member 60 inwardly along the path as indicated by arrow 80 with the specific retraction occurring along the path as indicated by arrow 82 inwardly from the deployed position DP towards the seatback 18.

Figure 7B:
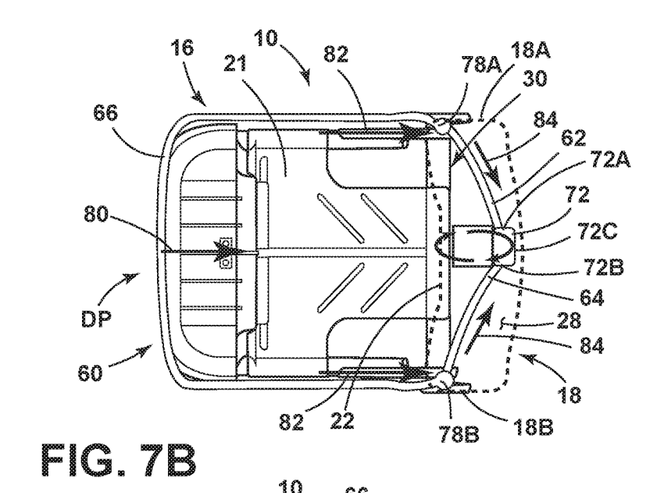
FIG. 7B is a top plan view of the seat assembly of FIG. 7A with the belt member in a deployed position and coupled at opposed ends thereof to a centrally disposed retractor mechanism.

Referring now to FIG. 7B, the seat assembly 10 is shown with the retractor mechanism 72 disposed within the interior portion 28 of the seatback 18. In the embodiment shown in FIG. 7B, the retractor mechanism 72 is shown disposed in a generally central location within the interior portion 28 of the seatback 18 and is coupled to the seatback frame 30. As further shown in FIG. 7B, the belt member 60 is in the deployed position DP around the upper support surface 21 of the seat portion 16. The first end 62 of the belt member 60 is shown coupled to the retractor mechanism 72 at a first attachment location 72A. As further shown in FIG. 7B, the second end 64 of the belt member 60 is shown coupled to the retractor mechanism 72 at a second attachment location 72B. In the embodiment shown in FIG. 7B, the belt member 60 may be operably coupled to guides disposed on the seatback frame 30 at guide locations 78A, 78B disposed on opposite sides 18A, 18B of the seatback 18 to guide retraction of the belt member 60. Thus, the retraction of the belt member 60 in the embodiment of FIG. 7B occurs at both the first end 62 and the second end 64 of the belt member 60 as indicated at arrows 82 and 84. Retraction of the belt member 60 by the retractor mechanism 72 drives the belt member 60 inwardly along the path as indicated by arrow 80 by retracting both the first and second ends 62, 64 of the belt member 60 from the deployed position DP towards the seatback 18 simultaneously as indicated by arrows 82. The first and second ends 62, 64 of the belt member 60 are further retracted inwardly towards the centrally disposed retractor mechanism 72 as indicated by arrows 84. The retractor mechanism 72 may be a rotary spool retracting mechanism that winds up the body portion 66 of the belt member 60 by having the first and second ends 62, 64 the belt member 60 coupled to the rotary spool. It is further contemplated that the retractor mechanism 72 may be a load-limit pyro-spool retractor mechanism integrated into the seatback 18 that uses an explosive retracting technique to quickly retract the belt member 60. It is contemplated that all types of retractor mechanisms may be used interchangeably at the various positions shown in the provided drawings, as well as other suitable positions disposed on the seat assembly 10.

Figure 7C:
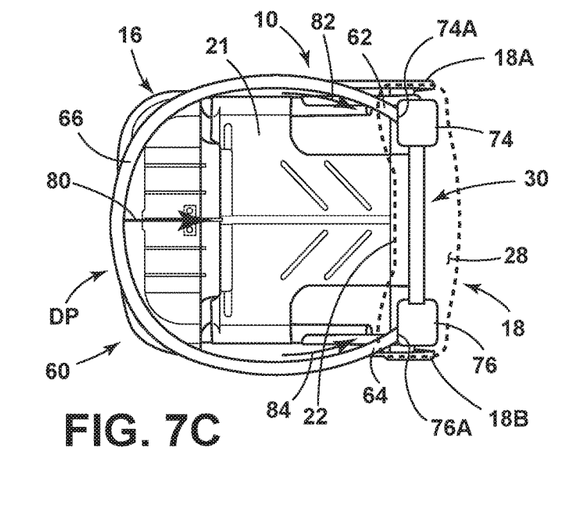
FIG. 7C is a top plan view of the seat assembly of FIG. 7B with the belt member in a deployed position and coupled at opposed ends thereof to respective first and second retractor mechanisms.

Referring now to FIG. 7C, the seat assembly 10 is shown with first and second retractor mechanisms 74, 76 disposed within the interior portion 28 of the seatback 18. In the embodiment shown in FIG. 7C, the first and second retractor mechanisms 74, 76 are shown disposed at opposite sides 18A, 18B of the seatback 18 as coupled to the seatback frame 30. As further shown in FIG. 7C, the belt member 60 is in the deployed position DP around the upper support surface 21 of the seat portion 16. The first end 62 of the belt member 60 is shown coupled to the first retractor mechanism 74 at a first attachment location 74A. As further shown in FIG. 7C, the second end 64 of the belt member 60 is shown coupled to the second retractor mechanism 76 at a second attachment location 76A that is spaced-apart from the first attachment location 74A. Thus, the retraction of the belt member 60 in the embodiment of FIG. 7C occurs at both the first end 62 and the second end 64 of the belt member 60 as indicated at arrows 82 and 84. Retraction of the belt member 60 by the first and second retractor mechanisms 74, 76 drives the belt member 60 inwardly along the path as indicated by arrow 80 by retracting both the first and second ends 62, 64 of the belt member 60 from the deployed position DP towards the seatback 18 simultaneously as indicated by arrows 82, 84. In the embodiment of FIG. 7C, the first and second retractor mechanisms 74, 76 are disposed at opposite sides 18A, 18B, respectively, of the seatback 18, such that the associated first and second attachment locations 74A, 76A are also disposed at the opposite sides 18A, 18B of the seatback 18. As such, the first and second attachment locations 74A, 76A are also disposed at the opposed sides 22A, 22B (FIG. 2) of the back support portion 22 of the seatback 18 in their spaced-apart configuration to retract the belt member 60 from the opposite sides 18A, 18B of the seatback 18 after deployment.

Figure 7D:
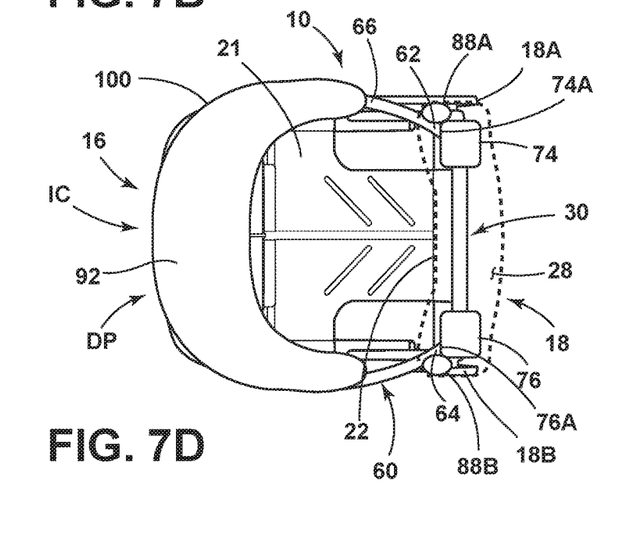
FIG. 7D is a top plan view of the seat assembly of FIG. 7C with an inflatable member in an inflated condition and coupled to the belt member.

Referring now to FIG. 7D, the seat assembly 10 is shown with the belt member 60 in the deployed position DP. In the embodiment of FIG. 7D, the belt member 60 includes an inflatable member 92 disposed on the body portion 66 of the belt member 60. The inflatable member 92 is contemplated to be operable between inflated and deflated conditions. In the embodiment shown in FIG. 7D, the inflatable member 92 is shown in the inflated condition IC. The belt member 60 of FIG. 7D is operably coupled to dual retractor mechanisms 74, 76 as described above with reference to FIG. 7C. It is contemplated that the belt member 60 shown in any one of FIGS. 7A-7C may include an inflatable member, such as inflatable member 92 shown in FIG. 7D. The inflatable member 92 is contemplated to be operably and fluidically coupled to an inflator mechanism, such as first and second inflator mechanisms 88A, 88B shown disposed on opposite sides 18A, 18B of the seatback 18. The inflator mechanisms 88A, 88B may be operably coupled to the seatback frame 30 and fluidically coupled to the inflatable member 92 by a supply line interconnecting the same. In this way, the inflator mechanisms 88A, 88B can inflate the inflatable member 92 to the inflated condition IC from the deflated condition DC (FIG. 8) after the belt member 60 has been deployed, or during deployment of the belt member 60. It is contemplated that the inflatable member 92 may need only one inflator mechanism to properly inflate.

Thus, as shown in FIGS. 7A-7D, the belt member 60 is in a deployed position DP wherein the belt member 60 is disposed outside of the interior portion 28 of the seatback 18. Specifically, the belt member 60 is shown in FIGS. 7A-7D as being in the deployed position DP in which the body portion 66 of the belt member 60 is positioned in front of and spaced-apart from the back support portion 22 of the seatback 18. In this way, the belt member 60 is spaced-apart from the seatback 18 to provide room for a seat occupant, such as seat occupant 90 shown in FIG. 5, around whom the belt member 60 is disposed in the deployed position DP. As such, the belt member 60 is deployed with the airbag assembly 50 from the stowed position as SP, in which both the belt member 60 and the airbag assembly 50 are positioned within the interior portion 28 of the seatback 18, to the deployed position DP in which portions of the belt member 60 and the airbag assembly 50 are disposed outside of the interior portion 28 of the seatback 18.

Figure 8:
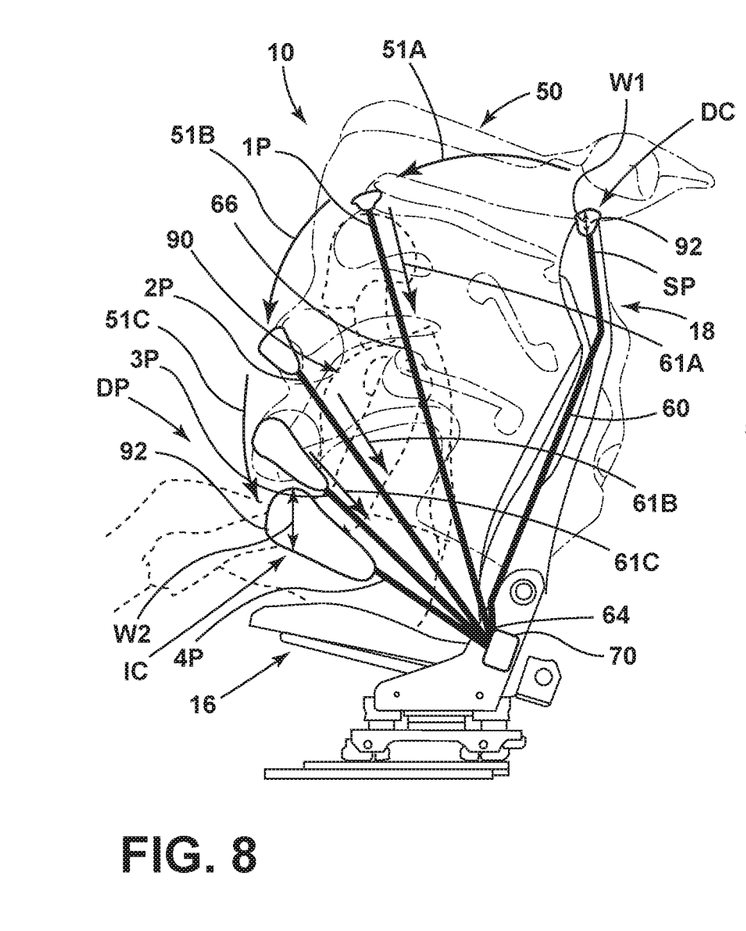
FIG. 8 is a side elevation view of the seat assembly of FIG. 7D showing relative movement of the overhead airbag assembly and the belt member deploying from the stowed positions, and further showing relative movement of the belt member during retraction of the belt member as well as inflation of the inflatable member.

Referring now to FIG. 8, the airbag assembly 50 is shown as being deployed over the seat occupant 90 to surround the seat occupant 90. Specifically, in FIG. 8, the airbag assembly 50 and the belt member 60 are shown in the stowed position SP, and move from the stowed position SP towards a deployed position DP around the seat occupant 90. As coupled to the airbag assembly 50, the belt member 60 moves towards the deployed position DP from the stowed position SP with the airbag assembly 50. Thus, the airbag assembly 50 and the belt member 60 exit the interior portion 28 of the seatback 18 and project in a seat-forward direction from the stowed position SP to the deployed position DP, such that the airbag assembly 50 and the belt member 60 are disposed around the centrally disposed back support portion 22 of the seatback 18 in the deployed position DP. With the inflatable member 92 coupled to the belt member 60, the inflatable member 92 is also deployed from the interior portion 28 of the seatback 18. In FIG. 8, the inflatable member 92 is shown disposed within the interior portion 28 of the seatback 18 when the belt member 60 is in the stowed position SP. As disposed within the interior portion 28 of the seatback 18, it is contemplated that the inflatable member 92 is in the deflated condition DC, such that the inflatable member 92 can be appropriately packaged within the interior portion 28 of the seatback 18. In the embodiment of FIG. 8, the inflatable member 92 is shown as inflating during the deployment of the belt member 60 from the deflated condition DC to the inflated condition IC. In the deflated condition DC, the inflatable member 92 includes a first width W1. In the inflated condition IC, the inflatable member 92 includes a second width W2 that is greater than the first width W1. In this way, the inflatable member 92 provides a flexibly resilient portion of the belt member 60 to wrap around the seat occupant 90. Further, the inflatable member 92 provides a greater width of the body portion 66 of the belt member 60 to establish augmented contact with the seat occupant 90 for retaining the seat occupant 90 in the seat assembly 10.

Figure 9:
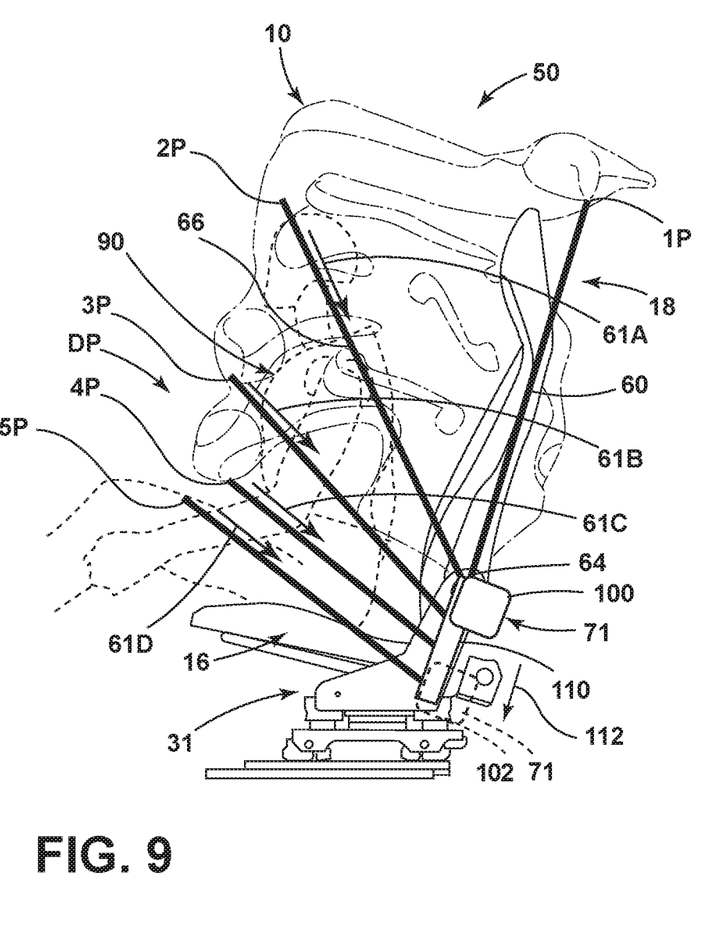
FIG. 9 is a side elevation view of the seat assembly of FIG. 6 showing relative movement of the overhead airbag assembly and the belt member deploying from the stowed positions, and further showing relative movement of the retractor mechanism along a slider mechanism.

Referring now to FIG. 9, the belt member 60 is shown coupled to a retractor mechanism 71. The retractor mechanism 71 is shown disposed along a slider mechanism 110. The slider mechanism 110 is operably coupled to a seat frame 31 of the seat assembly 10. The retractor mechanism 71 is slideably coupled to the slider mechanism 110 and configured to slide along the slider mechanism 110 between first and second positions 100, 102. As such, the retractor mechanism 71 moves downward along the path as indicated by arrow 112 from the first position 100 to the second position 102 along the slider mechanism 110. As coupled to the slider mechanism 110, the retractor mechanism 71 defines a slideable retractor mechanism operative for linear movement between first and second positions 100, 102. Movement of the slideable retractor mechanism 71 downward from the first position 100 to the second position 102 is operative to at least partially retract the belt member 60 from the deployed position DP. It is contemplated that the retractor mechanism 71 of the embodiment of FIG. 9 is still configured to retract the belt member 60 on its own, however, movement of the position of the slideable retractor mechanism 71 along the slider mechanism 110 further retracts the belt member 60 relative to the seat occupant 90. It is contemplated that dual slider mechanisms, each similar to the operation of slider mechanism 110 described above, may be used with dual retractor mechanisms, such as first and second retractor mechanisms 74, 76 shown in FIGS. 7C and 7D. In the embodiment shown in FIG. 9, the slider mechanism 110 is shown disposed on a seat frame 31, however, it is contemplated that the slider mechanism 110 can be disposed on any suitable portion of the seat assembly 10.

Figure 10:
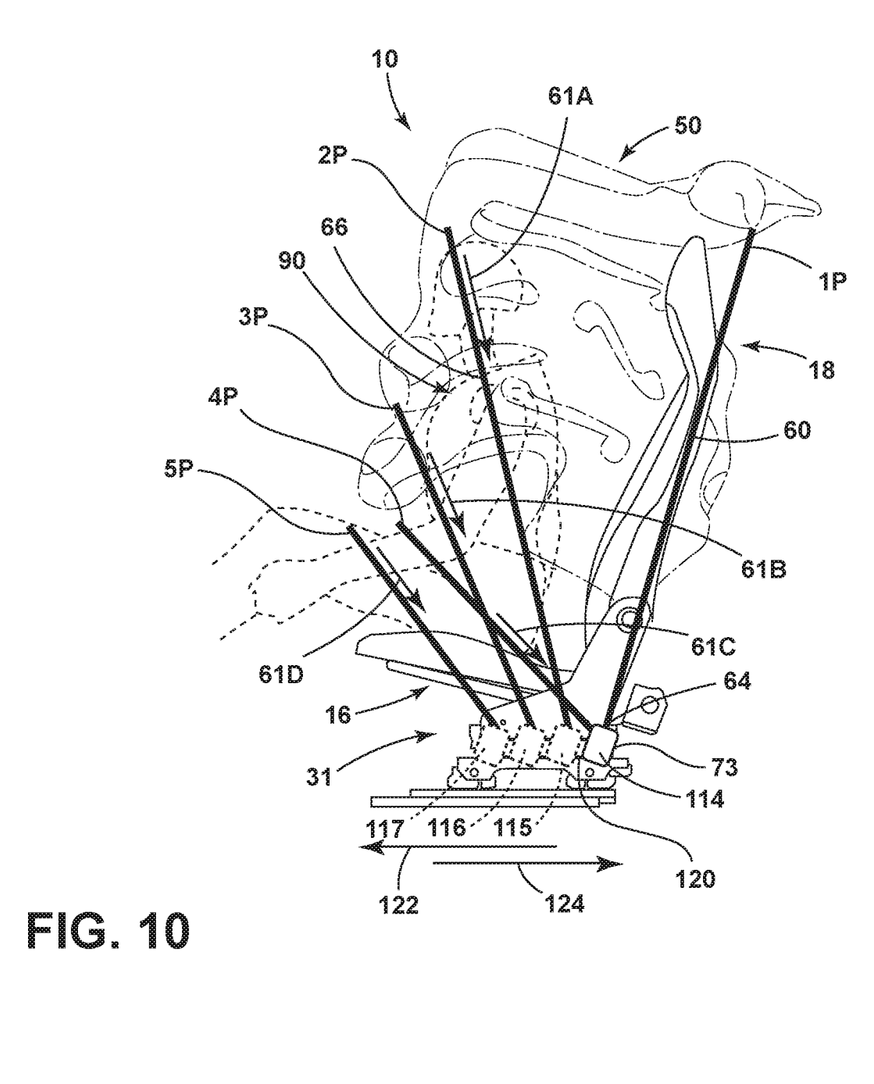
FIG. 10 is a side elevation view of the seat assembly of FIG. 6 showing relative movement of the overhead airbag assembly and the belt member deploying from the stowed positions, and further showing relative movement of the retractor mechanism along a slider mechanism.

Referring now to FIG. 10, the belt member 60 is shown coupled to a retractor mechanism 73. The retractor mechanism 73 is shown disposed along a second embodiment of a slider mechanism 120. The slider mechanism 120 is operably coupled to a seat frame 31 of the seat assembly 10. The retractor mechanism 73 is slideably coupled to the slider mechanism 120 and configured to slide along the slider mechanism 120 between a plurality of positions 114-117. As such, the retractor mechanism 73 moves forward and rearward along the paths as indicated by arrows 122, 124 from the first position 114 to the fourth position 117 along the slider mechanism 120. The positions 114-117 are contemplated to be varied positions along the slider mechanism 120, but are not representative of all the positions for the retractor mechanism 73 along the slider mechanism 120. As coupled to the slider mechanism 120, the retractor mechanism 73 defines a slideable retractor mechanism operative for linear movement between the plurality of positions 114-117. Specifically, it is contemplated that the retractor mechanism 73 may move along the slider mechanism 120 in the direction as indicated by arrow 122 from the first position 114 to the second position 115, from the second position 115 to the third position 116, and from the third position 116 to the fourth position 117 during the deployment of the belt member 60. It is further contemplated that the retractor mechanism 73 may move along the slider mechanism 120 in the direction as indicated by arrow 124 from the fourth position 117 to the third position 116, from the third position 116 to the second position 115, and from the second position 115 to the first position 114 during the deployment of the belt member 60. Thus, the retractor mechanism 73 slides along the slider mechanism 120 in the forward direction as indicated by arrow 122 from the first position 114 to the fourth position 117, and then slides rearwardly along the slider mechanism 120 from the fourth position 117 to the first position 114. In this way, the slideable retractor mechanism 73 is contemplated be to be disposed in the first position 114 when the belt member 60 and the airbag assembly 50 are in the stowed position SP, and it is further contemplated that the slideable retractor mechanism 73 is disposed in the first position 114 when the belt member 60 and the airbag assembly 50 are in the deployed position DP. As such, the movement of the slideable retractor mechanism 73 along the slider mechanism 120 takes place during the active deployment of the belt member 60 an airbag assembly 50. Movement of the slideable retractor mechanism 73 rearwardly from the fourth position 117 to the first position 114 is operative to at least partially retract the belt member 60 from the deployed position DP. It is contemplated that the slideable retractor mechanism 73 of the embodiment of FIG. 10 is still configured to retract the belt member 60 on its own, however, reward movement of the position of the slideable retractor mechanism 73 along the slider mechanism 120 further retracts the belt member 60 relative to the seat occupant 90. It is contemplated that dual slider mechanisms, each similar to the operation of slider mechanism 120 described above, may be used with dual retractor mechanisms, such as first and second retractor mechanisms 74, 76 shown in FIGS. 7C and 7D. In the embodiment shown in FIG. 10, the slider mechanism 120 is shown disposed on a seat frame 31, however, it is contemplated that the slider mechanism 120 can be disposed on any suitable portion of the seat assembly 10.

According to one aspect of the present invention, a seat assembly includes a seatback having a back support portion centrally disposed thereon. At least one retractor mechanism is operably coupled to the seatback and includes first and second attachment locations spaced-apart from one another. A belt member includes first and second ends respectively coupled to the first and second attachment locations of the at least one retractor mechanism. The belt member further includes a body portion disposed between the first and second ends that is operable between a stowed position and a deployed position. The belt member is disposed in front of the back support portion of the seatback in the deployed position. The belt member is disposed in an interior portion of the seatback in the stowed position.

Embodiments of the first aspect of the invention can include any one or a combination of the following features:
 the first and second attachment locations are disposed on opposite sides of the back support portion;
 an airbag assembly supported in an interior portion of the seatback in a stowed position, wherein the airbag assembly is configured to deploy from the stowed position to a deployed position in a seat-forward direction around the back support portion of the seatback;
 the body portion of the belt member is operably coupled to the airbag assembly for deployment therewith;
 the seatback includes a headrest assembly disposed above the back support portion, and further wherein the airbag assembly is disposed on opposed sides of the back support portion of the seatback and is further disposed over the headrest assembly of the seatback in the stowed position;
 the body portion of the belt member is disposed on the opposed sides of the back support portion of the seatback and is further disposed over the headrest assembly of the seatback in the stowed position;
 the at least one retractor mechanism includes first and second retractor mechanisms with the first attachment location disposed on the first retractor mechanism and the second attachment location disposed on the second retractor mechanism; and
 a slider mechanism coupled to one of the first retractor mechanism and the second retractor mechanism to define a slideable retractor mechanism operative for movement between first and second positions, wherein movement of the slideable retractor mechanism from the first position to the second position is operative to retract the belt member from the deployed position.

According to another aspect of the present invention, a seat assembly includes a seatback including an interior portion. A belt member includes first and second ends with a body portion disposed therebetween. The belt member is operable between a stowed position, wherein the body portion of the belt member is received within the interior portion of the seatback, and a deployed position, wherein the body portion of the belt member is positioned outside of the interior portion of the seatback.

Embodiments of the second aspect of the invention can include any one or a combination of the following features:
 a retractor mechanism operably coupled to one of the first end of the belt member, the second end of the belt member, and a combination thereof;
 the retractor mechanism is disposed within the interior portion of the seatback;
 an inflatable member disposed on the body portion of the belt member and operable between inflated and deflated conditions;
 an airbag assembly supported in the interior portion of the seatback in a stowed position, wherein the airbag assembly is configured to deploy in a seat-forward direction to a deployed position, wherein the airbag assembly is disposed around a centrally disposed back support portion of the seatback in the deployed position;
 the body portion of the belt member is operably coupled to the airbag assembly for deployment therewith;
 a retractor mechanism coupled to one of the first end and the second end of the belt member; and
 a slider mechanism, wherein the retractor mechanism is slideably supported on the slider mechanism for movement between a plurality of positions.

According to yet another aspect of the present invention, a seat assembly includes a belt member spanning between opposed sides of a seatback and operable between stowed and deployed positions. A retractor mechanism is operably coupled to the belt member and operative to retract the belt member from the deployed position. An inflatable member is disposed on the belt member and operable between inflated and deflated conditions.

Embodiments of the third aspect of the invention can include any one or a combination of the following features:
 an inflator mechanism configured to inflate the inflatable member to the inflated condition during a deployment of the belt member;
 the inflatable member includes a first width in the deflated condition, and further wherein the inflatable member includes a second width in the inflated condition that is greater than the first width;
 an airbag assembly supported in an interior portion of the seatback in a stowed position, wherein the airbag assembly is configured to deploy in a seat-forward direction to a deployed position, wherein the airbag assembly is disposed around a centrally disposed back support portion of the seatback in the deployed position; and
 the belt member is operably coupled to the airbag assembly.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:
1. A seat assembly, comprising:
 a seatback having a back support portion centrally disposed thereon;
 at least one retractor mechanism operably coupled to the seatback and having first and second attachment locations spaced-apart from one another;

wherein the at least one retractor mechanism includes first and second retractor mechanisms with the first attachment location disposed on the first retractor mechanism and the second attachment location disposed on the second retractor mechanism;

a belt member having first and second ends respectively coupled to the first and second attachment locations of the at least one retractor mechanism, wherein the belt member further includes a body portion disposed between the first and second ends that is operable between a deployed position, wherein the belt member is disposed in front of the back support portion of the seatback, and a stowed position, wherein the belt member is received in the seatback; and a slider mechanism coupled to one of the first retractor mechanism and the second retractor mechanism to define a slideable retractor mechanism operative for movement between first and second positions, wherein movement of the slideable retractor mechanism from the first position to the second position is operative to retract the belt member from the deployed position.

2. The seat assembly of claim 1, wherein the first and second attachment locations are disposed on opposite sides of the back support portion.

3. The seat assembly of claim 1, including:
an airbag assembly supported in an interior portion of the seatback in a stowed position, wherein the airbag assembly is configured to deploy from the stowed position to a deployed position in a seat-forward direction around the back support portion of the seatback.

4. The seat assembly of claim 3, wherein the body portion of the belt member is operably coupled to the airbag assembly for deployment therewith.

5. The seat assembly of claim 4, wherein the seatback includes a headrest assembly disposed above the back support portion, and further wherein the airbag assembly is disposed on opposed sides of the back support portion of the seatback and is further disposed over the headrest assembly of the seatback in the stowed position.

6. The seat assembly of claim 5, wherein the body portion of the belt member is disposed on the opposed sides of the back support portion of the seatback and is further disposed over the headrest assembly of the seatback in the stowed position.

7. A seat assembly, comprising:
a seatback having an interior portion;
a belt member having first and second ends with a body portion disposed therebetween, wherein the belt member is operable between a stowed position wherein the body portion of the belt member is received within the interior portion of the seatback, and a deployed position wherein the body portion of the belt member is positioned outside of the interior portion of the seatback;
a retractor mechanism coupled to one of the first end and the second end of the belt member; and
a slider mechanism, wherein the retractor mechanism is slideably supported on the slider mechanism for movement between a plurality of positions.

8. The seat assembly of claim 7, including:
a retractor mechanism operably coupled to one of the first end of the belt member, the second end of the belt member, and a combination thereof.

9. The seat assembly of claim 8, wherein the retractor mechanism is disposed within the interior portion of the seatback.

10. The seat assembly of claim 7, including:
an inflatable member disposed on the body portion of the belt member and operable between inflated and deflated conditions.

11. The seat assembly of claim 7, including:
an airbag assembly supported in the interior portion of the seatback in a stowed position, wherein the airbag assembly is configured to deploy in a seat-forward direction to a deployed position, wherein the airbag assembly is disposed around a centrally disposed back support portion of the seatback in the deployed position.

12. The seat assembly of claim 11, wherein the body portion of the belt member is operably coupled to the airbag assembly for deployment therewith.

13. A seat assembly, comprising:
a belt member spanning between opposed sides of a seatback and operable between stowed and deployed positions;
a retractor mechanism operably coupled to the belt member and operative to retract the belt member from the deployed position;
an inflatable member disposed on the belt member and operable between inflated and deflated conditions; and
a slider mechanism, wherein the retractor mechanism is slideably supported on the slider mechanism for movement between a plurality of positions.

14. The seat assembly of claim 13, including:
an inflator mechanism configured to inflate the inflatable member to the inflated condition during a deployment of the belt member.

15. The seat assembly of claim 14, wherein the inflatable member includes a first width in the deflated condition, and further wherein the inflatable member includes a second width in the inflated condition that is greater than the first width.

16. The seat assembly of claim 13, including:
an airbag assembly supported in an interior portion of the seatback in a stowed position, wherein the airbag assembly is configured to deploy in a seat-forward direction to a deployed position, wherein the airbag assembly is disposed around a centrally disposed back support portion of the seatback in the deployed position.

17. The seat assembly of claim 16, wherein the belt member is operably coupled to the airbag assembly.

* * * * *